No. 640,797. Patented Jan. 9, 1900.
J. C. NOFSINGER.
BELT GUIDE.
(Application filed Sept. 25, 1899.)
(No Model.)
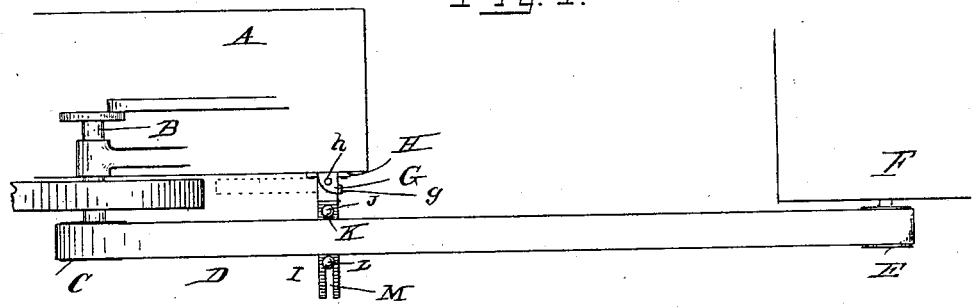
Fig. 1.
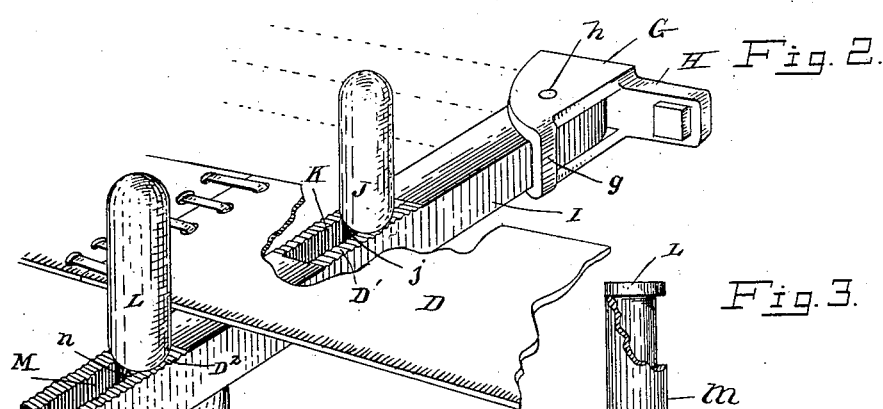
Fig. 2.
Fig. 3.
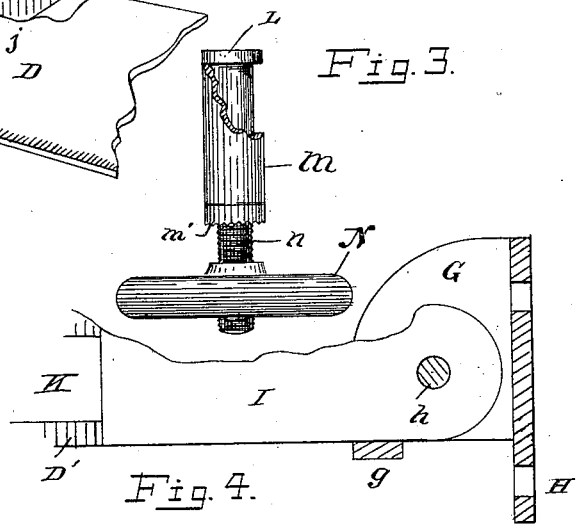
Fig. 4.
Witnesses—
W. C. Andrew.
J. H. Blusch.
Inventor.
John C. Nofsinger
By L. M. Thurlow
Atty.

UNITED STATES PATENT OFFICE.

JOHN C. NOFSINGER, OF WASHINGTON, ILLINOIS.

BELT-GUIDE.

SPECIFICATION forming part of Letters Patent No. 640,797, dated January 9, 1900.

Application filed September 25, 1899. Serial No. 731,683. (No model.)

*To all whom it may concern:*

Be it known that I, JOHN C. NOFSINGER, a citizen of the United States, residing at Washington, in the county of Tazewell and State of Illinois, have invented certain new and useful Improvements in Belt-Guides; and I do hereby declare that the following is a full, clear, and exact description of the invention, which will enable others skilled in the art to which it appertains to make and use the same.

This invention pertains to belt-guides for use on engines and the like, but more particularly for use on traction or threshing engines.

The object of the invention is to furnish a traction-engine with a guide for the belt that will prevent the latter from slipping off the pulleys.

The further object of the invention is to furnish an engine of the character described with a guide, into which the belt may be placed in order to permit the pulleys to be brought into line with very little trouble and without the necessity of employing several men to gain the desired end.

In the appended drawings, in which letters of reference correspond with those of the specification, Figure 1 is a plan view of part of a traction-engine and threshing-machine, showing my belt-guide in use. Fig. 2 is a perspective view of the belt-guide, showing the belt therein. Fig. 3 is an elevation of a guide-pin, showing friction-roller thereon. Fig. 4 is a plan view of part of the guide, showing a supporting-bracket in part section.

A indicates the boiler of a traction-engine of any type or style of manufacture, such as is used for threshing purposes. B shows the shaft thereof, and C the driving-pulley.

D is the belt, and E a pulley on the threshing-machine F.

Bolted or otherwise suitably attached to the boiler or other convenient part of the engine is a bracket G, having suitable ears H for bolting purposes. The upper and lower arms of such bracket are connected rigidly by means of a strap $g$, which also serves as a stop for the arm I, pivoted between the said arms G at $h$. Said arm I is of any length suitable to the particular engine in use and depends, as is obvious, on the distance between the pulley of the engine and the boiler or support for such arm. I employ adjustable guide-pins J and L perpendicular to the said arm I, the former held in a slot K, as shown. The pin is provided with a shoulder, which is corrugated or roughened and made to engage the corrugations D' of the arm. The threaded extremity $j$ of the pin projects through the said slot K and is fitted with a threaded hand-wheel N, Figs. 2 and 3, which serves to set the pin at any desired position along the length of the arm. The outer free end of the arm I is bifurcated, as at M, and holds the pin L in same manner as described above. Evidently the slot at M may extend entirely through to the slot K, if desired, and the end may be closed to strengthen the arm. These pins just described may be of any desired shape and may be provided with a friction-roller $m$, Fig. 3, wherein the said pin is provided with a head at the top and a shoulder near the bottom to furnish a support for said roller. The figures show the corrugated shoulder above mentioned at $m'$ and the threaded shank $n$.

It is observed that I do not limit myself to any particular form of my device. Either the upper or lower strand of the belt may be held by the guide, but of course the portion running toward the pulley must be used.

The stop $g$ prevents the arm I from moving out of line, and it is understood that it must be so placed that the belt in passing between the pins J and L will keep the arm against it.

Usually in setting an engine in line with the thresher it is necessary for a number of men to assist in the various manipulations in setting the machines in place; but by the use of this guide the belt is merely placed between the pins and upon the pulley and the engine backed into position. This draws the belt into place and keeps it from falling while the work is in progress. When extra heavy work is being done by the thresher, when at times the belt is likely to slip from the pulley, the guide is there to preclude the possibility of such a mishap. Obviously a similar guide may be employed to advantage on the thresher also.

It will be found that my device will be of advantage on other kinds of machinery as well as those described, and it is my purpose to so construct the apparatus that it may be applicable to all machines.

The dotted lines in Figs. 1 and 2 show the position of the arms when closed and out of the way.

While I show the roughened or corrugated pins and arm-surfaces, I may not use such means necessarily.

Having thus described my invention, what I claim as new, and desire to secure by Letters Patent, is—

1. In a belt-guide, the combination of a bracket, for attachment to an engine, or other apparatus, for the purposes set forth, an arm pivoted, at one end, to said bracket, there being slots in the arm, adjustable guide-pins in the slots, and means for securing such pins in place substantially as set forth.

2. In a belt-guide, the combination of a bracket G for attachment to an engine or other apparatus, for the purposes set forth, an arm I pivoted at one end to such bracket, a stop $g$ on the bracket for limiting the movement of the said arm I in one direction, there being slots K and M in the latter, adjustable pins J and L in such slots, means on the pins for securing them in the desired position, there being serrations on the under side of the pins and serrations on the arm at each side of the slots for engaging the serrations on the said pins all substantially as specified.

3. In a belt-guide, an arm pivoted at one end to the engine, for the purposes set forth, and adapted to swing on its pivot to open and close as set forth, a stop for limiting the opening movement whereby the said arm is located at right angles to direction of movement to the belt, and a pin in such pivotal arm at each side of the belt, substantially as set forth.

In testimony whereof I affix my signature in presence of two witnesses.

JOHN C. NOFSINGER.

Witnesses:
E. L. MEYERS,
C. M. DUNNINGTON.